(12) United States Patent
Woo et al.

(10) Patent No.: US 10,940,679 B2
(45) Date of Patent: Mar. 9, 2021

(54) LAMINATION APPARATUS

(71) Applicant: Samsung Electronics Co., Ltd., Gyeonggi-do (KR)

(72) Inventors: Sung-Gwan Woo, Gyeonggi-do (KR); Ki-Ju Kwak, Seoul (KR)

(73) Assignee: Samsung Electronics Co., Ltd

( * ) Notice: Subject to any disclaimer, the term of this patent is extended or adjusted under 35 U.S.C. 154(b) by 162 days.

(21) Appl. No.: 16/308,703

(22) PCT Filed: Jun. 9, 2017

(86) PCT No.: PCT/KR2017/006024
§ 371 (c)(1),
(2) Date: Dec. 10, 2018

(87) PCT Pub. No.: WO2017/213460
PCT Pub. Date: Dec. 14, 2017

(65) Prior Publication Data
US 2019/0143659 A1    May 16, 2019

(30) Foreign Application Priority Data
Jun. 9, 2016 (KR) .................. 10-2016-0071446

(51) Int. Cl.
*B32B 37/00* (2006.01)
*B29D 11/00* (2006.01)

(52) U.S. Cl.
CPC .......... *B32B 37/0053* (2013.01); *B29D 11/00* (2013.01); *B32B 37/00* (2013.01); *B32B 2457/20* (2013.01)

(58) Field of Classification Search
CPC . B32B 37/00; B32B 37/0053; B32B 2457/20; B29D 11/00; Y10T 156/17; B29C 65/78
See application file for complete search history.

(56) References Cited

U.S. PATENT DOCUMENTS 5,810,965 A * 9/1998 Fwu .................... B32B 37/0053
100/171
2016/0229166 A1* 8/2016 Tanaka .................. B32B 37/182

FOREIGN PATENT DOCUMENTS

| KR | 1020150048547 | 5/2015 |
|---|---|---|
| KR | 1020150068014 | 6/2015 |
| KR | 1020150100017 | 9/2015 |
| KR | 1020150104473 | 9/2015 |
| KR | 1020150110878 | 10/2015 |
| KR | 1020150113397 | 10/2015 |
| KR | 1020150113420 | 10/2015 |
| KR | 1020150137603 | 12/2015 |

(Continued)

OTHER PUBLICATIONS

PCT/ISA/210 Search Report issued on PCT/KR2017/006024 (pp. 5).
PCT/ISA/237 Written Opinion issued on PCT/KR2017/006024 (pp. 6).

*Primary Examiner* — Mark A Osele
*Assistant Examiner* — Christopher C Caillouet
(74) *Attorney, Agent, or Firm* — The Farrell Law Firm, P.C.

(57) ABSTRACT

According to various embodiments, a lamination apparatus for laminating object members may comprise: a movable body portion; a guide portion for guiding the body portion; and a rotating portion for rotating an outer surface of the body portion according to the motion of the body portion.

16 Claims, 10 Drawing Sheets

(56) References Cited

FOREIGN PATENT DOCUMENTS

| KR | 1020160000967 | 1/2016 |
|----|---------------|--------|
| KR | 1020160050949 | 5/2016 |

* cited by examiner

LAMINATION APPARATUS

PRIORITY

This application is a National Phase Entry of PCT International Application No. PCT/KR2017/006024, which was filed on Jun. 9, 2017, and claims priority to Korean Patent Application No. 10-2016-0071446, which was filed on Jun. 9, 2016, the content of each of which are incorporated herein by reference.

TECHNICAL FIELD

Various embodiments of the present invention relate to a lamination apparatus.

BACKGROUND ART

A variety of electronic devices such as a smart phone, a tablet personal computer (PC) or a mobile phone includes a display for data input and output. Components of the display, for example, a window, a display panel, a touch screen panel, a polarization panel or various films may be laminated using various lamination devices.

DISCLOSURE OF INVENTION

Technical Problem

In such lamination, a target member to laminate may be pushed or deformed by frictional force of a lamination device, to thus cause a defect. Alternatively, air bubbles may enter between target members and a yield rate may be lowered.

Meanwhile, a display included in a recent electronic device includes a curved display where at least some region has a bended curved surface and thus may improve usability and aesthetics. If components of the bended display are laminated, it may be more highly likely that such a problem occurs in the lamination process of the bended portion. In addition, if the target members to laminate have various shapes such as a three-dimensional (3D) curved shape or a spherical shape, there is a limit in laminating with a conventional lamination device.

Various embodiments of the present invention may provide a lamination apparatus for improving a lamination quality in laminating the components of not only a flat display but also the curved display.

Various embodiments of the present invention may laminate target members of various shapes such as a 3D curved shape or a spherical shape.

Solution to Problem

According to various embodiments, a lamination apparatus for laminating target members may include a main body portion which is movable; a guide portion for guiding the main body portion; and a rotation portion for rotating an outer surface of the main body portion according to movement of the main body portion.

Advantageous Effects of Invention

In various embodiments, in laminating target members, it is possible to prevent defects caused by slip, distortion or deformation between the target members. In addition, they may be laminated to prevent air bubbles from entering between the target members.

In various embodiments, if at least some region of a target member has a bended curved surface, the lamination process may be conducted efficiently. In particular, even if the target member includes the curved surface of a very small radius of curvature, it may be laminated effectively through rolling frictional force. For example, even if the radius of curvature of a surface of the target member is very small and close to a right angle, it may be laminated using the lamination apparatus according to an embodiment without slip, distortion or deformation between the target members.

In various embodiments, even if the shape of the target member includes various shapes such as a 3D curved surface or a spherical shape, it may be laminated with a high quality.

BEST MODE FOR CARRYING OUT THE INVENTION

Figure 1:
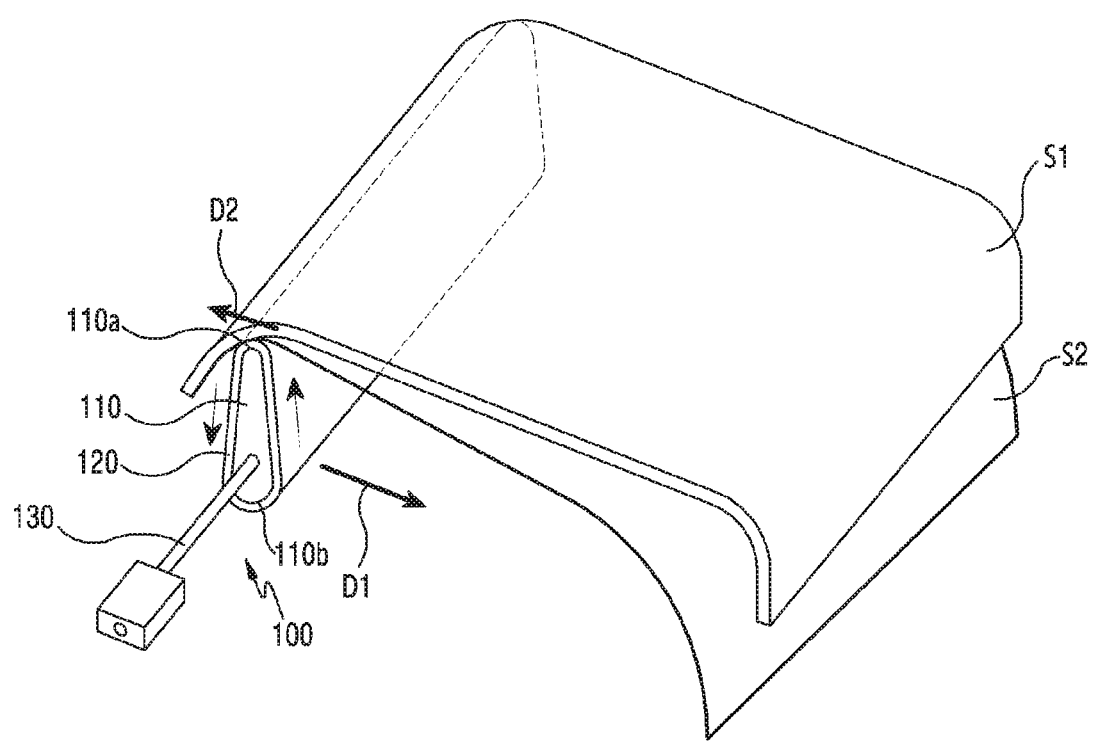
FIG. 1 is a diagram for illustrating a lamination apparatus and a lamination method using the same according to various embodiments of the present invention.

Hereinafter, various embodiments of the present disclosure are disclosed with reference to the attached drawings. However, it should be understood that it is not intend to limit technique described in the present disclosure to a particular embodiment form but to cover various modifications, equivalents, and/or alternatives of the embodiment of the present disclosure. In relation to descriptions of the drawings, like reference numerals may be used for similar components.

In this disclosure, the expressions "have", "may have", "include", or "may include" refer to existence of a corresponding feature (e.g., numeral, function, operation, or constituent element such as component), and do not exclude additional features.

In the present disclosure, the expressions "A or B", "at least one of A or/and B", or "one or more of A or/and B" may include all possible combinations of the items listed. For example, the expressions "A or B", "at least one of A and B", or "at least one of A or B" refer to all of (1) including at least one A, (2) including at least one B, or (3) including all of at least one A and at least one B.

The expressions "a first", "a second", "the first", or "the second" as used in the present disclosure may be used to modify denote various components regardless of the order and/or the importance and to distinguish one element from another element, and do not limit the corresponding components. For example, a first user device and a second user device may indicate different user devices regardless of the order or the importance. For example, a first element may be referred to as a second element, and similarly, a second element may be referred to as a first element, without departing from the scope of the present disclosure.

It should be understood that when an element (e.g., a first element) is referred to as being (operatively or communicatively) "coupled with/to" or "connected to" another element (e.g., a second element), the element may be coupled with/to the another element directly, or coupled through other element (e.g., a third element). By contrast, when an element (e.g., a first element) is "directly coupled" or "directly connected" to another element (e.g., a second element), it should be understood that there is no other element (e.g., a third element) between the element and the another element.

The expression "configured (or set) to" as used in the present disclosure may be used interchangeably with, for example, "suitable for", "having the capacity to", "designed to", "adapted to", "made to", or "capable of" according to the situation. The term "configured (or set) to" may not necessarily imply "specifically designed to" in hardware. Instead, in some situation, an expression "apparatus configured to" may mean that the apparatus "can" operate together with another apparatus or other components. For example, "a processor configured (or set) to perform A, B, and C" may indicate a dedicated processor (e.g., an embedded processor) for performing a corresponding operation, or a generic-purpose processor (e.g., a central processing unit (CPU) or an application processor (AP)) which may perform a corresponding operation by executing one or more software programs stored in a memory device.

Terms used in the present disclosure are used for describing particular embodiments and are not intended to limit the scope of other embodiments. A singular form may include a plurality of forms unless it is explicitly differently represented. All the terms used herein, including technical and scientific terms, may have the same meanings as terms that are generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even when terms are defined in this disclosure the terms should not be interpreted to exclude the embodiments of the present disclosure.

Figure 2:
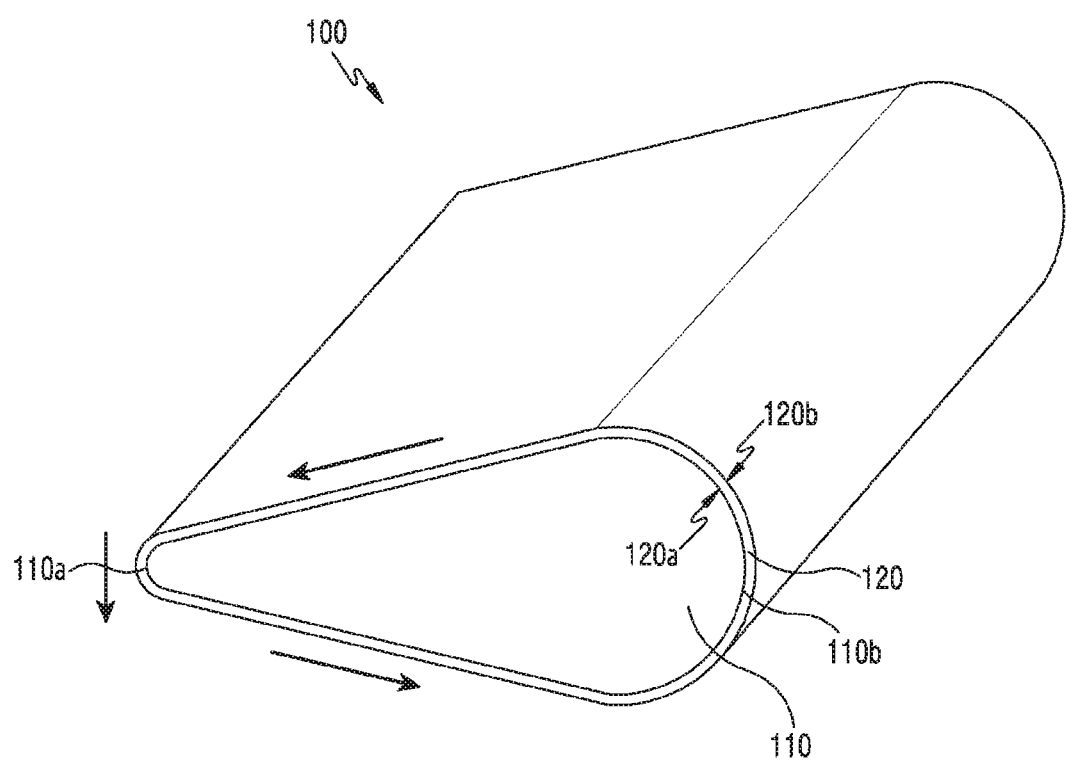
FIG. 2 is a perspective view of a lamination apparatus according to various embodiments of the present invention.

FIG. 1 is a diagram for illustrating a lamination apparatus and a lamination method using the same according to various embodiments of the present invention. FIG. 2 is a perspective view of a lamination apparatus according to various embodiments of the present invention.

A lamination apparatus 100 according to various embodiments may laminate components of a display substrate of various electronic devices. Various electronic devices may include, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a MPEG-1 audio layer-3 (MP3) player, a mobile medical device, a camera, or a wearable device. The lamination apparatus 100 may laminate the components of the display substrate included in various electronic devices, for example, a window, a display panel, a touch screen panel, a polarization panel or various films. The lamination apparatus 100 may laminate between the components of the display panel using an adhesive or a glue, for example, a double-sided adhesive film, a pressure sensitive adhesive, an optical clear adhesive (OCA) or an optical clear resin (OCR). This may improve visibility and reduce thickness of the fabricated display substrate.

Referring to FIG. 1, the lamination apparatus 100 according to various embodiments may include a main body portion 110, a rotation portion 120 and a guide portion 130. The lamination apparatus 100 according to various embodiments may laminate a second target member S2 on a first target member S1. In so doing, the first target member S1 and the second target member S2 may be any one of the components of the display substrate included in various electronic devices as mentioned earlier.

The main body portion 110 may move to laminate the first target member S1 and the second target member S2. The main body portion 110 may move in one direction while laminating the second target member S2 to the first target member S1. The main body portion 110 may move from one end to other end of the first target member S1 to laminate the second target member S2 to the first target member S1. The main body portion 110 may move horizontally along the first target member S1. Alternatively, the main body portion 110 may move vertically along the first target member S1. Alternatively, the main body portion 110 may rotate based on a specific axis on the first target member S1. Meanwhile, the embodiment is not limited to this, and the lamination apparatus 100 including the main body portion 110 may be fixed and the first target member S1 and the second target member S2 may move.

The man body portion 110 may have certain strength to apply a constant pressure to the first target member S1 and the second target member S2. For example, the main body portion 110 may include aluminum, metal or stainless steel.

Referring to FIG. 1 and FIG. 2, the main body portion 110 may include at least one or more contact portions which contact the first target member S1 and/or the second target member S2. For example, the main body portion 110 may include any one of a first contact portion 110a and a second contact portion 110b which have different shapes. The first contact portion 110a or the second contact portion 110b may substantially apply the pressure to the first target member S1 and/or the second target member S2. The first contact portion 110a or the second contact portion 110b may move in line contact with the first target member S1 and/or the second target member S2. That is, any one of the first contact portion 110a and the second contact portion 110b may contact the first target member S1 and/or the second target member S2. The first contact portion 110a may be one terminal end of the main body portion 110. The first contact portion 110a may be narrower than other portions of the main body portion 110 in width. However, the embodiment is not limited to this, and the width of the first contact portion 110a may be the same as or similar to the width of the other portions of the main body portion 110. The second contact portion 110b may be the other terminal end of the main body portion 110. That is, the second contact portion 110b may be an opposite portion to the first contact portion 110a in the main body portion 110. The second contact portion 110b may be wider than the first contact portion 110a. In various embodiments, if the main body portion 110 moves to laminate the first target member S1 and the second target member S2, the first contact portion 110a or the second contact portion 110b may selectively contact according to a curvature radius or a shape of the first target member S1. For example, if the main body portion 110 moves a portion of a relatively small curvature radius in the first target member S1, the first contact portion 110a of the narrow width may contact the first target member S1. Alternatively, if the main body portion 110 moves a portion of a relatively great curvature radius in the first target member S1, the second contact portion 110b may contact the first target member S1 through rotation of the main body part 110. Meanwhile, the embodiment is not limited to this, and the main body portion 110 may include contact portions having various widths and shapes.

The rotation portion 120 may be disposed on the main body portion 110. The rotation portion 120 may be disposed along an outer circumferential surface of the main body portion 110. The rotation portion 120 may be disposed to surround the main body portion 110. The rotation portion 120 may move along an outer surface of the main body portion 110. The rotation portion 120 may rotate along the outer surface of the main body portion 110. As the main body portion 110 moves, the rotation portion 120 may roll on the outer surface of the main body portion 110. For example, if the main body portion 110 moves in a first direction D1, the rotation portion 120 may rotate in one direction on the main body portion 110. Alternatively, the rotation portion 120 on the contact portion 110a of the main body portion 110 may move in a second direction D2 which is opposite to the first direction D1. The rotation portion 120 may be, for example, a conveyor belt.

In various embodiments, the first target member S1 and the second target member S2 may be laminated by rolling frictional force. That is, the first target member S1 and the second target member S2 may be laminated by resistance force against the rolling of the rotation portion. Various embodiments may laminate by changing sliding friction between the first target member S1 and the second target member S2 to the rolling friction through the rotation portion 120. Since the rolling friction has a magnitude of a several tenth of sliding friction, defects caused by the friction may be reduced in the lamination of the first target member S1 and the second target element S2. Further, the first target member S1 including the surface of the small curvature radius may be also laminated without defects.

The rotation portion 120 may include a first surface 120a and a second surface 120b which is opposite to the first surface 120a. The first surface 120a may contact the main body portion 110. The first surface 120a may contact directly the main body portion 110, or contact indirectly through other layer formed on the first surface 120a. If the rotation portion 120 moves on the main body portion 110, the other layer may be formed on the first surface 120 so as to reduce the friction between the first surface 120a and the main body portion 110. For example, the first surface 120a may further include a coating layer. Alternatively, the first surface 120a may be formed with a material of less friction than the second face 120b.

The second surface 120b may contact the second target member S2. The frictional force of the second surface 120b may be greater than the frictional force of the first surface 120a. That is, the frictional force of the second surface 120b may laminate the first target member S1 and the second target member S2 with the rolling friction. In addition, such frictional force may laminate to prevent air bubbles from entering between the first target member S1 and the second target member S2. Further, defects due to slip, distortion or deformation of the second target member S2 may be prevented in the lamination. Further, if the second target member S2 is a pressure sensitive adhesive or an adhesive, the second target member S2 may uniformly spread on the first target member S1.

Meanwhile, the second surface 120b may include a material having elasticity. For example, the second surface 120b may include rubber, silicone, or polymer material. Since the second surface 120b has the elasticity, the shape of the rotation unit 120 may also change suitably according to the shape of the first target member S1 which contacts the second surface 120b. Thus, if the first target member S1 is in a shape including the curved surface of different curvature radiuses or curves, the second target member S2 may uniformly laminate according to the shape of the first target member S1.

The lamination apparatus 100 according to various embodiments may further include a guide portion 130. The guide portion 130 may be coupled to the main body portion 110 and guide the movement of the main body portion 110. For example, the guide portion 130 may guide the main body portion 110 to move in the first direction D1. Alternatively, the guide portion 130 may guide the main body portion 110 to rotate based on the specific axis. The guide portion 130 may include, for example, a motor. However, the embodiment is not limited to this, and the guide portion 130 may include various configurations for guiding the movement of the main body portion 110. Meanwhile, although not depicted in the drawing, the guide portion 130 may further include a guide portion for securely receiving the main body portion 110.

Figure 3A:
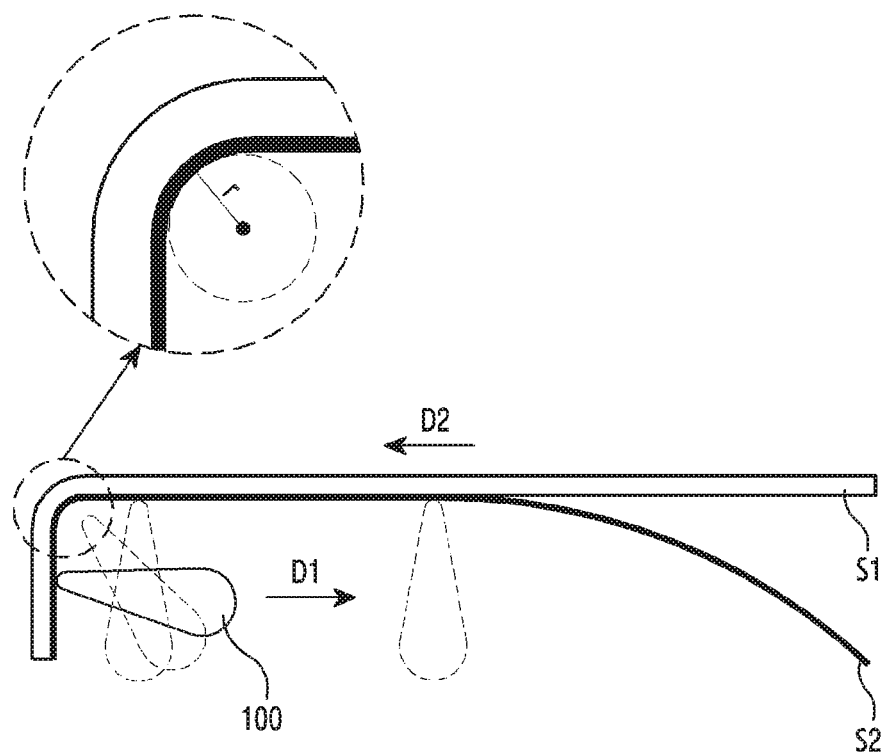
FIG. 3A and FIG. 3B are diagrams for illustrating a lamination apparatus and a lamination method using the same according to various embodiments of the present invention.
Figure 3B:
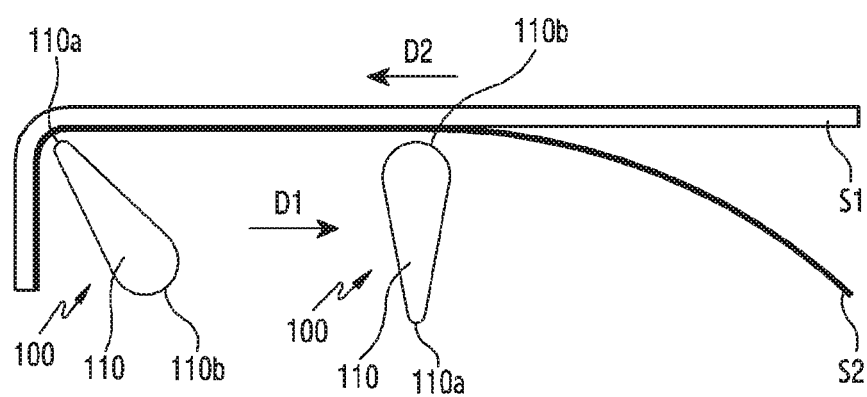

FIG. 3A and FIG. 3B are diagrams for illustrating a lamination apparatus and a lamination method using the same according to various embodiments of the present invention.

Referring to FIG. 3A, a lamination apparatus 100 according to various embodiments may move in a first direction D1 and laminate a first target member S1 and a second target member S2. If at least some region of the first target member S1 has a bended curved surface, various embodiments may efficiently perform the lamination process. In particular, even if the first target member S1 includes a curved surface of a very small curvature radius r, rolling frictional force is exerted in a second direction D2 and it may be laminated effectively. For example, even if the curvature radius r of a surface of the first target member S1 is very small and close to the right angle, it may be laminated using the lamination apparatus 100 without slip, distortion or deformation of the second target member S2.

Referring to FIG. 3B, a main body portion 110 of the lamination apparatus 100 according to various embodiments may include at least one or more contact portions, and such contact portions may selectively contact the first target member S1. For example, the main body portion 110 may include a first contact portion 110a and a second contact portion 110b which have different shapes. The first contact portion 110a and the second contact portion 110b may selectively contact the first target member S1, according to rotation of the main body portion 110. The first contact portion 110a and the second contact portion 110b may selectively contact according to a curvature radius or a shape of the first target member S1. For example, if the main body portion 110 moves a portion of a relatively small curvature radius in the first target member S1, the first contact portion 110a of the narrow width may contact the first target member S1. Alternatively, if the main body portion 110 moves a portion of a relatively great curvature radius in the first target member S1, the second contact portion 110b of the great width may contact the first target member S1 through the rotation of the main body part 110.

Figure 4:
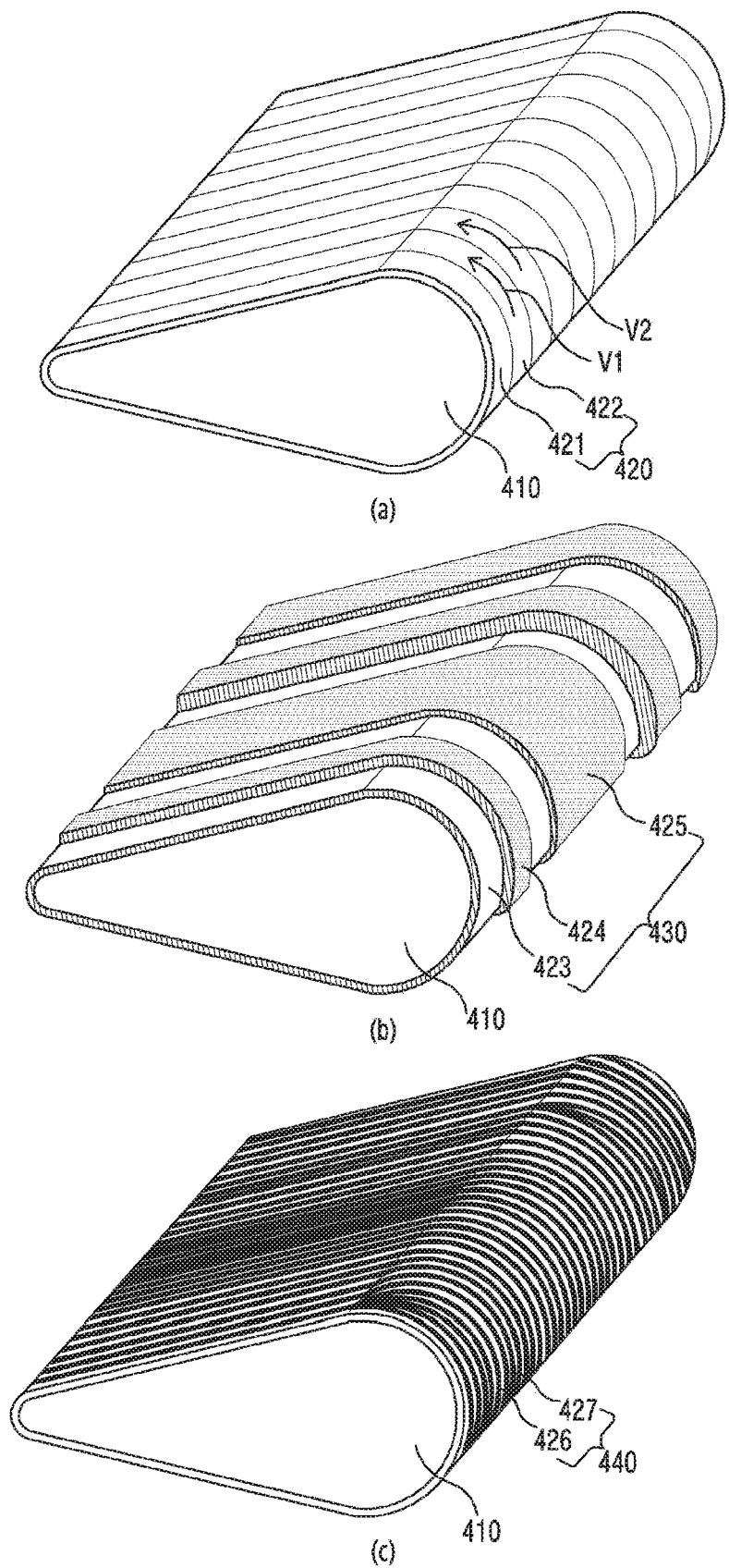
FIG. 4 is perspective views of lamination apparatuses according to various embodiments.

FIG. 4 is perspective views of lamination apparatuses according to various embodiments.

Referring to FIG. 4A, a rotation portion 420 disposed on a main body portion 410 may include at least one sub rotation portions. For example, the rotation portion 420 may include a first sub rotation portion 421 and a second sub rotation portion 422. The first sub rotation portion 421 and the second sub rotation portion 422 may be separated from each other. The first sub rotation portion 421 and the second sub rotation portion 422 may move independently. The first sub rotation portion 421 and the second sub rotation portion 422 may move at different speeds according to a shape of a target member (S1 in FIG. 3) on the main body portion 410. The first sub rotation portion 421 and the second sub rotation unit 422 may move at different speeds according to a shape of a surface of the first target member S1 contacted respectively. For example, the first sub rotation unit 421 may move at a first speed V1, and the second sub rotation portion 422 may move at a second speed V2 which is different from the first speed V1. The first sub rotation portion 421 and the second sub rotation unit 422 may include the same material. Alternatively, the first sub rotation portion 421 and the second sub rotation portion 422 may include different materials. The first sub rotation portion 421 and the second sub rotation unit 422 may include different physical characteristics. Tension, elasticity or strength of the first sub rotation portion 421 and the second sub rotation portion 422 may be different from each other. The first sub rotation portion 421 and the second sub rotation portion 422 may have the same thickness or width. The first sub rotation portion 421 and the second sub rotation portion 422 may have different thicknesses or widths. As shown in the drawing, the rotation portion 420 may include a plurality of first sub rotation portions 421 and second sub rotation portions 422.

Referring to FIG. 4B, the rotation portion 430 disposed on the main body portion 410 may include at least one sub rotation portions. For example, the rotation portion 420 may include a first sub rotation portion 423, a second sub rotation portion 424 and a third sub rotation portion 425. The first sub rotation portion 423, the second sub rotation portion 424 and the third sub rotation portion 425 may be separated from each other. The first sub rotation portion 423, the second sub rotation portion 424 and the third sub rotation portion 425 may move independently. The first sub rotation portion 423, the second sub rotation portion 424 and the third sub rotation portion 425 may move at different speeds according to the shape of the target member (S1 in FIG. 3) on the main body portion 410. The first sub rotation portion 423, the second sub rotation portion 424 and the third sub rotation portion 425 may move at different speeds according to a shape of surface of the first target member S1 contacted respectively. The first sub rotation portion 423, the second sub rotation portion 424 and the third sub rotation portion 425 may include the same material. Alternatively, the first sub rotation portion 423, the second sub rotation portion 424 and the third sub rotation portion 425 may include different materials. The first sub rotation portion 423, the second sub rotation portion 424 and the third sub rotation portion 425 may include different physical characteristics. Tension, elasticity or strength of the first sub rotation portion 423, the second sub rotation portion 424 and the third sub rotation portion 425 may be different from each other. The first sub rotation portion 423, the second sub rotation portion 424 and the third sub rotation portion 425 may have different thicknesses or widths. The first sub rotation portion 423, the second sub rotation portion 424 and the third sub rotation portion 425 may have various thicknesses or widths. As shown in the drawing, the rotation portion 420 may include a plurality of first sub rotation portions 423, second sub rotation portions 424 and third sub rotation portions 425.

Referring to FIG. 4C, a rotation portion 440 disposed on the main body portion 410 may include at least one sub rotation portions. For example, the rotation portion 420 may include a first sub rotation portion 426 and a second sub rotation portion 427 which are linear. That is, the rotation portion 440 may include a plurality of lines. The first sub rotation portion 426 and the second sub rotation portion 427 may move independently on the main body portion 410. The first sub rotation portion 426 and the second sub rotation portion 427 may rotate at different speeds on the main body portion 410 according to the shape of the target member (S1 in FIG. 3). The first sub rotation portion 426 and the second sub rotation unit 427 may roll at different speeds according to the shape of the surface of the first target member S1 contacted respectively. The first sub rotation portion 426 and the second sub rotation unit 427 may include the same material. Alternatively, the first sub rotation portion 426 and the second sub rotation portion 427 may include different materials. The first sub rotation portion 426 and the second sub rotation unit 427 may include different physical characteristics. Tension, elasticity or strength of the first sub rotation portion 426 and the second sub rotation portion 427 may be different from each other. The first sub rotation portion 426 and the second sub rotation portion 427 may have the same thickness or width. The first sub rotation portion 426 and the second sub rotation portion 427 may have different thicknesses or widths. As shown in the drawing, the rotation portion 440 may include a plurality of first sub rotation portions 426 and second sub rotation portions 427.

Figure 5:
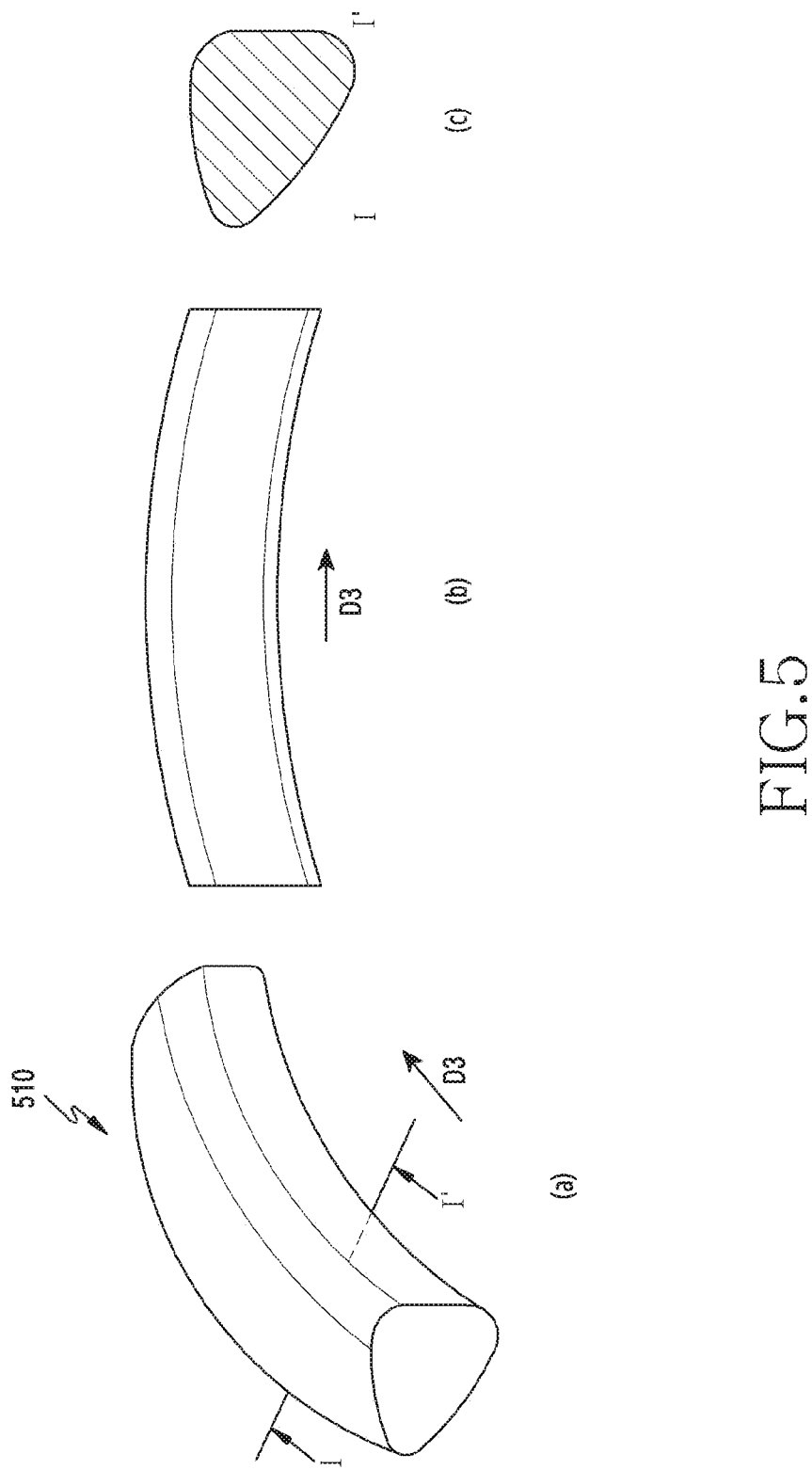
FIG. 5A is a perspective view of a main body portion according to various embodiments.
FIG. 5B is a plan view of the main body portion according to various embodiments.
FIG. 5C is a cross-sectional view taken along I-I' in FIG. 5A.

FIG. 5A is a perspective view of a main body portion according to various embodiments. FIG. 5B is a plan view of the main body portion according to various embodiments. FIG. 5C is a cross-sectional view taken along I-I' in FIG. 5A.

Referring to FIG. 5A, a main body portion 510 according to various embodiments may include various shapes. Alternatively, referring to FIG. 5A and FIG. 5B, the main body portion 510 may be in a shape which bends in a longitudinal direction D3. Referring to FIG. 5A and FIG. 5C, the main body portion 510 may include the same cross section along the longitudinal direction D3 of the main body portion 510.

Figure 6:
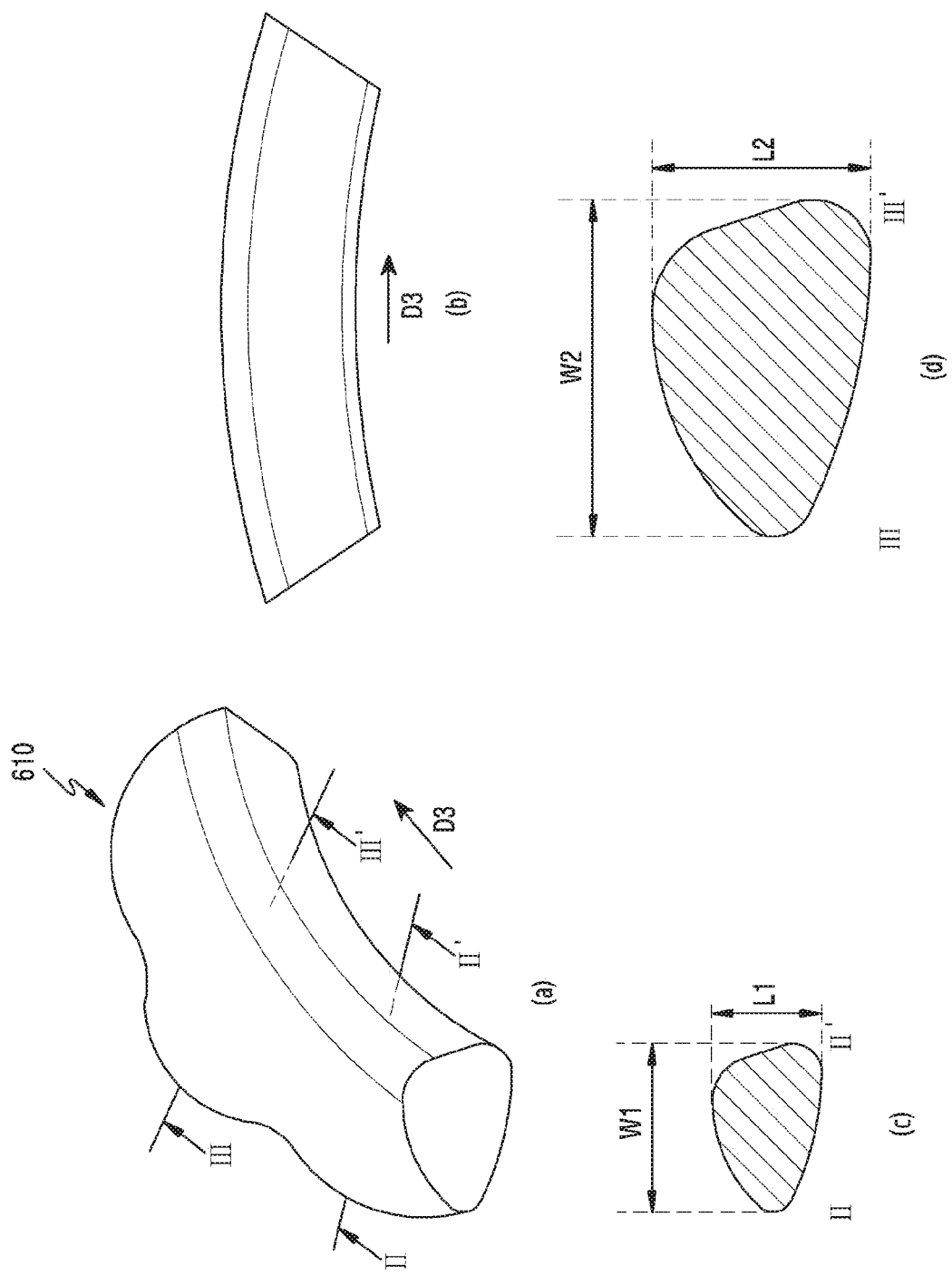
FIG. 6A is a perspective view of a main body portion according to various embodiments.
FIG. 6B is a plan view of the main body portion according to various embodiments.
FIG. 6C is a cross-sectional view taken along II-II' in FIG. 6A.
FIG. 6D is a cross-sectional view taken along III-III' in FIG. 6A.

FIG. 6A is a perspective view of a main body portion according to various embodiments. FIG. 6B is a plan view of the main body portion according to various embodiments. FIG. 6C is a cross-sectional view taken along II-II' in FIG. 6A. FIG. 6D is a cross-sectional view taken along III-III' in FIG. 6A.

Referring to FIG. 6A, a main body portion 610 according to various embodiments may include a variety of shapes. Alternatively, referring to FIG. 6A and FIG. 6B, the main body portion 510 may be in a shape which bends in a longitudinal direction D3. Referring to FIG. 6A, FIG. 6C and FIG. 6D, the main body portion 610 may include different cross sections along the longitudinal direction D3 of the main body portion 510. That is, the main body portion 610 may include the cross sections of different shapes. For example, as shown in FIG. 6C, one cross section of the main body portion 610 may include a first width W1 of the greatest width and a first length L1 of the longest length. At this time, as shown in FIG. 6D, another cross section of the main body portion 610 may include a second width W2 of the greatest width, and a size of the second width W2 may be different from the first width W1. Alternatively, another cross section of the main body portion 610 may include a second length L2 of the longest length, and the length of the second length L2 may be different from the first length L1.

Figure 7:
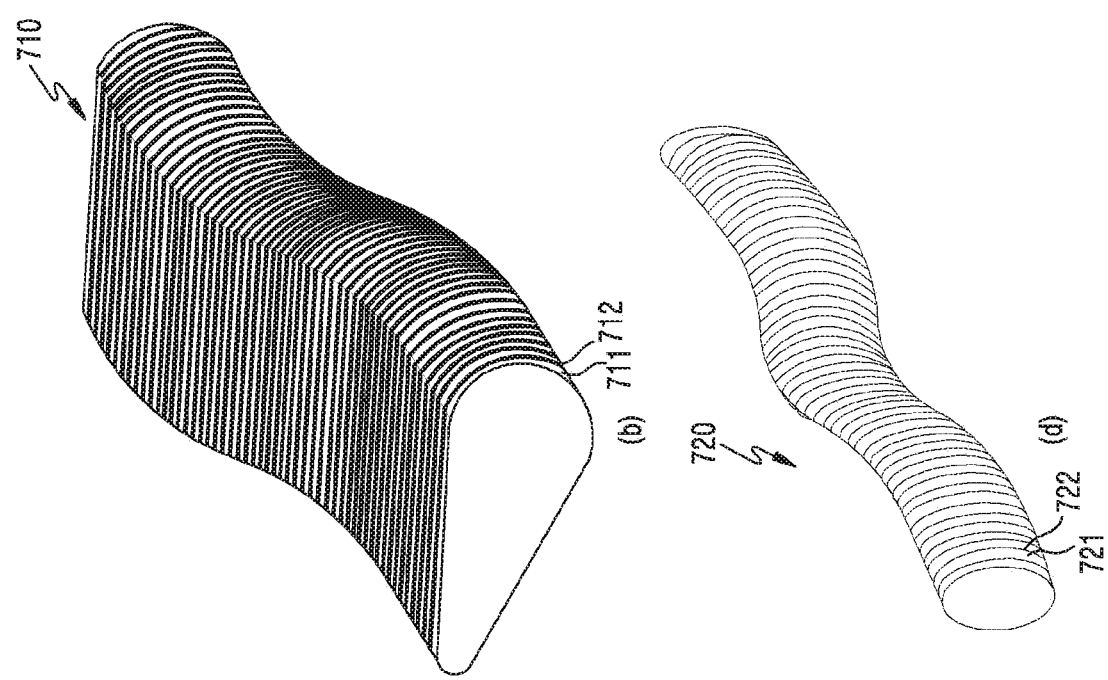
FIG. 7 is perspective views of a main body portion according to various embodiments.
Figure 7:
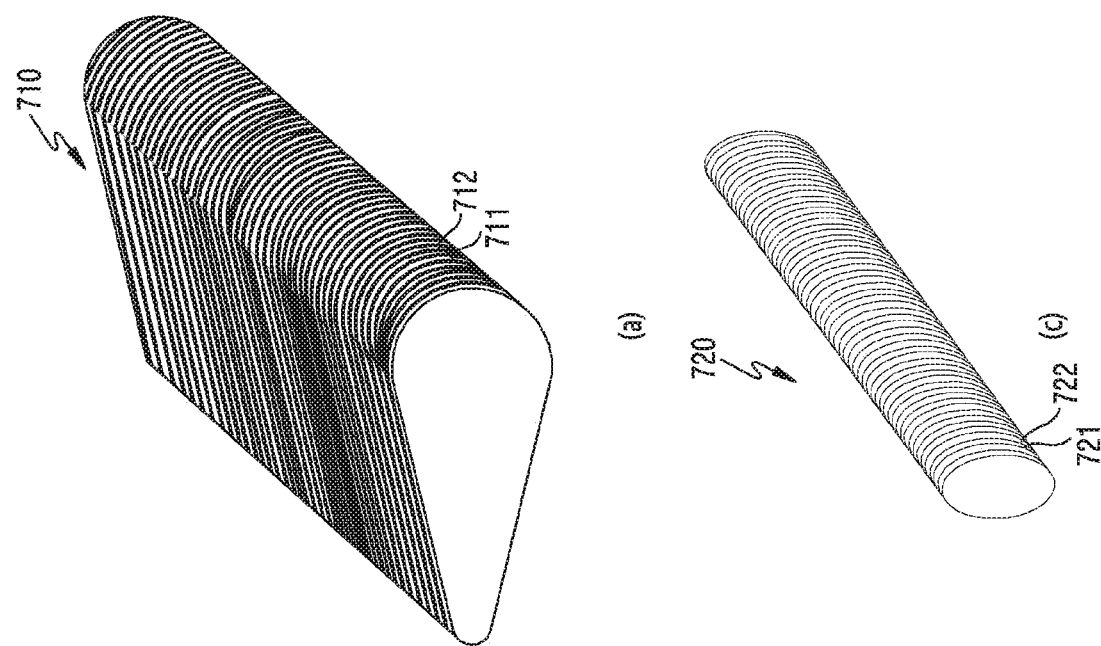

FIG. 7 is perspective views of a main body portion according to various embodiments.

Referring FIG. 7A, the main body portion 710 may be in a shape which becomes narrow in width of one end. The main body portion 710 may include at least one or sub main body portions 711 and 712. For example, the main body portion 710 may include a first sub main body portion 711 and a second sub main body portion 712. Referring to FIG. 7B, the first sub main body portion 711 and the second sub main body portion 712 are connected to each other, but may deform according to a contacting surface of a target member (S1 in FIG. 3). The first sub main body portion 711 and the second sub main body portion 712 may be deformed depending on the shape of the first target member S1 contacted respectively. The first sub main body portion 711 and the second sub main body portion 712 may be deformed according to curves of the first target member S1.

Respective rotation portions may be disposed on the first sub main body portion 711 and the second sub main body portion 712. For example, a first sub rotation portion may be disposed on the first sub main body portion 711, and if the main body portion 710 moves, the first sub rotation portion may rotate along the outer surface of the first sub main body portion 711. Similarly, a second sub rotation portion may be disposed on the second sub main body portion 712, and if the main body portion 710 moves, the second sub rotation portion may rotate along the outer surface of the second sub main body portion 712. That is, the respective sub rotation portions may be disposed on the respective sub main body portions and roll independently.

Referring to FIG. 7C, the main body portion 720 may be in a cylindrical shape. The main body portion 720 may include at least one or more sub main body portions 721 and 722. For example, the main body portion 710 may include a first sub main body portion 721 and a second sub main body portion 722. Referring to FIG. 7D, the first sub main body portion 721 and the second sub main body portion 722 are coupled to each other, and may be deformed according to the contacting surface of the target member (S1 of FIG. 3). The first sub main body portion 721 and the second sub main body portion 722 may be deformed according to the shape of the first target member S1 contacting respectively. The first sub main body portion 721 and the second sub main body portion 722 may be deformed according to the curves of the first target member S1.

Respective rotation portions may be disposed on the first sub main body portion 721 and the second rotation portion 722. For example, a first sub rotation portion may be disposed on the first sub main body portion 721, and if the main body portion 710 moves, the first sub rotation portion may rotate along the outer surface of the first sub main body portion 721. Similarly, a second sub rotation portion may be disposed on the second sub main body portion 722, and if the main body portion 710 moves, the second sub rotation portion may rotate along the outer surface of the second sub main body portion 722. That is, the respective sub rotation portions on the respective sub main body portions may be disposed and roll independently.

Meanwhile, the embodiment is not limited to this, but the main body portion of various shapes may include a plurality of sub main body portions. For example, the main body portions of FIG. 5 and FIG. 6 as aforementioned may also include a plurality of sub main body portions.

Figure 8:
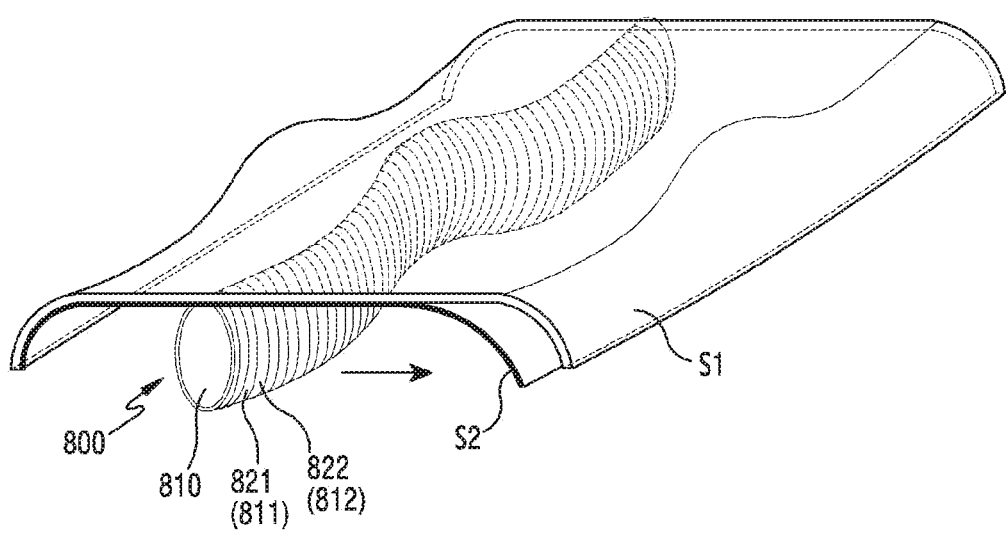
FIG. 8 is a diagram for illustrating a lamination apparatus and a lamination method using the same according to various embodiments of the present invention.

FIG. 8 is a diagram for illustrating a lamination apparatus and a lamination method using the same according to various embodiments of the present invention.

Referring to FIG. 8, a lamination apparatus 800 including the main body portion of FIG. 7 as described above may laminate a second target member S2 to a first target member S1 of various shapes. For example, the second target member S2 may be laminated on the first target member S1 having a 3D curved shape. The second target member S2 may be attached according to the shape of the first target member S1. In so doing, a main body portion 810 of the lamination apparatus 800 may include a plurality of sub main body portions 811 and 812. Hence, if the main body portion 810 moves while laminating the second target member S2 to the first target member S1, the sub main body portions 811 and 812 may be deformed according to the shape of the first target member S1. That is, the sub main body portions 811 and 812 may also form curves according to the curves of the first target member S1. Sub rotation portions 821 and 822 which may rotate independently may be disposed on these sub main body portions 811 and 812. For example, the first sub rotation portion 821 may be disposed on the first sub main body portion 811, and the second sub rotation portion 822 may be disposed on the second sub main body portion 812. The first sub rotation portion 821 and the second sub rotation portion 822 may move at different rotation speeds according to the shape of the first target member S1.

Meanwhile, the embodiment is not limited thereto, and may progress the lamination process by preparing in advance the main body portion 810 having the shape corresponding to the shape of the first target member S1.

Figure 9:
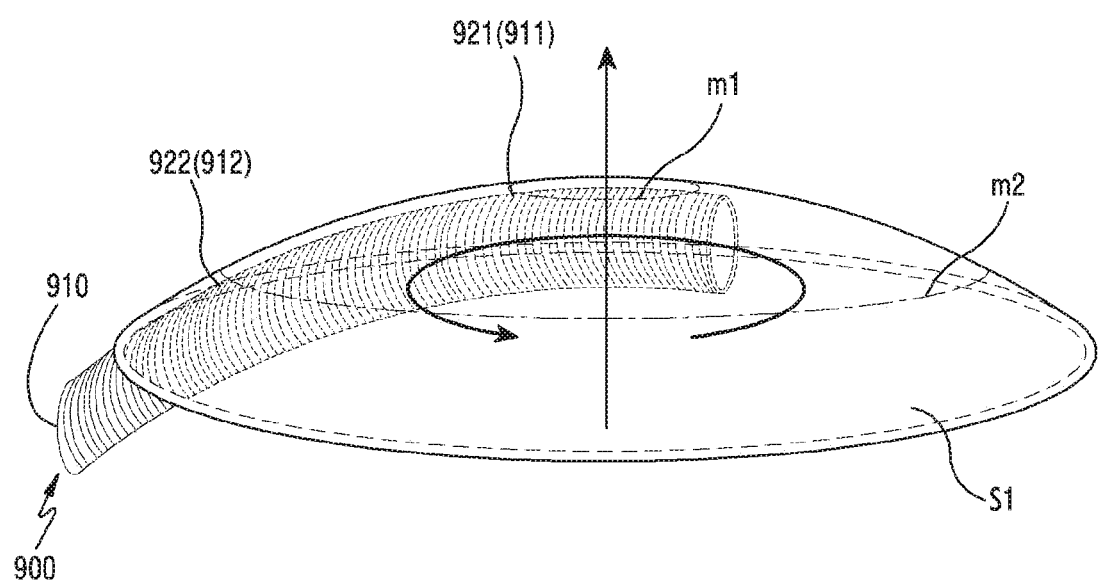
FIG. 9 is a diagram for illustrating a lamination apparatus and a lamination method using the same according to various embodiments of the present invention.

FIG. 9 is a diagram for illustrating a lamination apparatus and a lamination method using the same according to various embodiments of the present invention.

Referring to FIG. 9, a lamination apparatus 900 including the main body portion of FIG. 7 as described above may laminate a second target member to a first target member S1 of various shapes. For example, by rotating based on an axis X in the first target member S1 which is spherical, the lamination apparatus 900 may perform the lamination process. In so doing, depending on the shape of the first target member S1 or a contacting position of the laminating apparatus 900 on the first target member S1, a rotation speed of the lamination apparatus 900 may vary. For example, a second movement distance m2 in the rotation in contact with a region far from a rotation axis X is greater than a first movement distance m1 in the rotation of the laminating apparatus 900 in contact with a region close to the rotation axis X in the first target member S1. Hence, a movement speed in the rotation in contact with the region far from the rotation axis X is greater than a movement speed in the rotation of the laminating apparatus 900 in contact with the region close to the rotation axis X in the first target member S1.

In various embodiments, since a main body portion 910 includes sub main body portions 911 and 912, the lamination process may be performed on a first target member S1 of various shapes. In addition, the respective sub rotation portions 821 and 822 for rolling independently may be disposed on the respective sub main body portions 911 and 912. For example, the first sub rotation portion 921 may be disposed on the first sub main body portion 911, and the second sub rotation portion 922 may be disposed on the second sub main body portion 912. In so doing, if the first sub main body portion 911 and the second sub main body portion 912 rotate in contact with the first target member S1, the first sub rotation portion 921 and the second sub rotation portion 922 may roll independently on the first sub main body portion 911 and the second sub main body portion 912 respectively.

The first sub main body portion 911 may move the first movement distance m1, and the rotation speed or the number of the rotations of the first sub rotation portion 921 may vary according to the movement speed of the first sub main body portion 911. Similarly, the second sub main body portion 912 may move the second movement distance m2, and the rotation speed or the number of the rotations of the second sub rotation portion 922 may vary according to the movement speed of the second sub main body portion 912. Thus, the lamination process may be performed even if there are differences in the movement distance and the movement speed of the lamination apparatus 900 on the first target member S1 having various shapes. Further, air bubbles or lamination defects may be prevented in the lamination process conducted on the first target member S1 having various shapes.

According to various embodiments, a lamination apparatus 100 for laminating target members S1 and S2 may include a main body portion 110 which is movable, a guide portion 130 for guiding the main body portion 110, and a rotation portion 120 for rotating an outer surface of the main body portion 110 according to movement of the main body portion 110.

According to various embodiments, the rotation portion 420 may include at least one or more sub rotation portions 421 and 422.

According to various embodiments, the sub rotation portions 421 and 422 may include a first sub rotation portion 421 and a second sub rotation portion 422, and the first sub rotation portion 421 and the second sub rotation portion 422 may rotate independently according to the movement of the main body portion 410.

According to various embodiments, the first sub rotation portion 421 and the second sub rotation portion 422 may rotate at different speeds.

According to various embodiments, thicknesses of the first sub rotation portion 421 and the second sub rotation portion 422 may be different from each other.

According to various embodiments, materials of the first sub rotation portion 421 and the second sub rotation portion 422 may be different from each other.

According to various embodiments, the main body portion 110 may include a contact portion 110a which contacts the target members S1 and S2, the main body portion 110 may move in a first direction D1, and the rotation portion 120 may move in a second direction D2 opposite to the first direction D1 on the contact portion 110a.

According to various embodiments, the rotation portion 120 may include a first surface 120a which contacts the main body portion 110 and a second surface 120b which is opposite to the first surface 120a.

According to various embodiments, frictional force of the first surface 120a and the second surface 120b may be different.

According to various embodiments, the frictional force of the second surface 120b may be greater than the frictional force of the first surface 120a.

According to various embodiments, the first surface 120a may further include a coating layer.

According to various embodiments, the main body portion 710 may include at least one or more sub main body portions 711 and 712.

According to various embodiments, the sub main body portions 711 and 712 may include a first sub main body portion 711 and a second sub main body portion 712, and the first sub main body portion 711 and the second sub main body portion 712 may be deformed according to a shape of the target member S1.

According to various embodiments, the rotation portions 821 and 822 may be disposed on the sub main body portions 811 and 812 respectively.

According to various embodiments, the rotation portion 821 and 822 may include a first sub rotation portion 821 which rotates on the first sub main body portion 811 and a second sub rotation portion 822 which rotates on the second sub main body portion 812.

According to various embodiments, the main body portion 510 may include the same cross section along a longitudinal direction D3 of the main body portion 510.

According to various embodiments, the main body portion 510 may include at least one different cross section along a longitudinal direction D3 of the main body portion 610.

According to various embodiments, at least one of the target members S1 and S2 may include a curved surface of which at least some region is bended.

Meanwhile, the embodiments of the present invention disclosed in the specification and the drawings merely present specific examples to easily explain technical details of the present invention and to ease the understanding of the present invention, and do not limit the scope of the present invention. That is, it is apparent to those with ordinary skill in the art to which the present invention pertains that other modifications based on technical concepts of the present invention are possible.

The invention claimed is:

1. A lamination apparatus for laminating target members, comprising:
    a main body portion which is movable;
    a guide portion for guiding the main body portion; and
    a rotation portion that rotates along an outer surface of the main body portion according to movement of the main body portion,
    wherein the rotation portion comprise a first sub rotation portion and a second sub rotation portion, and
    wherein the first sub rotation portion and the second sub rotation portion are rotatable independently according to the movement of the main body portion.

2. The lamination apparatus of claim 1, wherein the first sub rotation portion and the second sub rotation portion rotate at different speeds.

3. The lamination apparatus of claim 1, wherein thicknesses of the first sub rotation portion and the second sub rotation portion are different from each other.

4. The lamination apparatus of claim 1, wherein materials of the first sub rotation portion and the second sub rotation portion are different from each other.

5. The lamination apparatus of claim 1, wherein the rotation portion comprises a first surface which contacts the main body portion and a second surface which is opposite to the first surface, and frictional force of the first surface and the second surface is different.

6. The lamination apparatus of claim 5, wherein the frictional force of the second surface is greater than the frictional force of the first surface.

7. The lamination apparatus of claim 5, wherein the first surface further comprises a coating layer.

8. The lamination apparatus of claim 1, wherein the main body portion comprises at least one or more sub main body portions.

9. The lamination apparatus of claim 8, wherein the sub main body portions comprise a first sub main body portion and a second sub main body portion, and the first sub main body portion and the second sub main body portion are deformed according to a shape of the target member.

10. The lamination apparatus of claim 8, wherein the first sub rotation portion rotates on the first sub main body portion and the second sub rotation portion rotates on the second sub main body portion.

11. The lamination apparatus of claim 8, wherein the rotation portion is disposed on the at least one or more sub main body portions.

12. The lamination apparatus of claim 1, wherein the main body portion comprises at least one different cross section along a longitudinal direction of the main body portion.

13. The lamination apparatus of claim 1, wherein at least one of the target members comprises a curved surface of which at least some region is bent.

14. The lamination apparatus of claim 1, wherein the main body portion comprises a contact portion which contacts the target members, the main body portion moves in a first direction, and the rotation portion moves in a second direction opposite to the first direction on the contact portion.

15. The lamination apparatus of claim 14, wherein the contact portion comprises a first contact portion and a second contact portion which have different shapes, and the first contact portion and the second contact portion selectively contact the target member.

16. The lamination apparatus of claim 1, wherein the main body portion comprises at least one different cross section along a longitudinal direction of the main body portion.

* * * * *